June 11, 1968     J. W. DRENNING     3,388,328
PULSED LASER SYSTEM FOR RELATIVE SPEED MEASUREMENT
Filed June 10, 1965

INVENTOR
JOHN W. DRENNING

BY *Burns, Doane, Benedict, Swecker & Mathis*

ATTORNEYS

United States Patent Office 3,388,328
Patented June 11, 1968

3,388,328
PULSED LASER SYSTEM FOR RELATIVE SPEED MEASUREMENT
John W. Drenning, Baltimore, Md., assignor to Koppers Company, Inc., Pittsburgh, Pa., a corporation of Delaware
Filed June 10, 1965, Ser. No. 462,923
1 Claim. (Cl. 324—70)

ABSTRACT OF THE DISCLOSURE

A velocity measuring system having a regularly recurrently pulsed laser and spaced infrared detector with a velocity indicator responsive to the detector and having means initiated into operation synchronously with operation of the laser.

---

Figure 1:
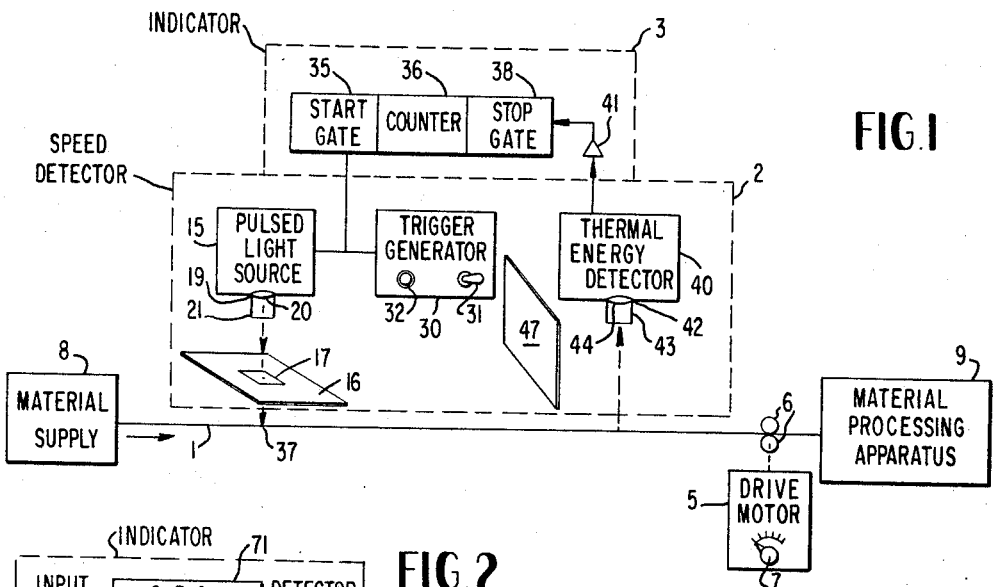

The present invention relates to the determination of relative speed between a measurement system and material. In particular, the invention provides for the measurement of relative speeds without physical contact between the system and the material. It is a special advantage of the present invention that the system may be operated remotely at very substantial distances from the material without physical interference therewith.

The measurement of relative speed is essential in many situations. In manufacturing processes, it is frequently necessary precisely to control the traveling speed of linear material. Speed measurement is normally carried out by means in physical contact with the material itself. Such physical contact is frequently undesirable where fragile linear material and webs, or unconsolidated fibres, are involved. Where the material is not fragile, moreover, physical engagement of a measuring system therewith often fails to achieve accurate measurement due to slippage between the material and the engaging element. Thus, where the relative movement occurs between the material of a road surface and the velocity measuring system carried in a vehicle, under conditions of acceleration or deacceleration, speed indication may become subject to serious errors. The same is true in other circumstances where the measurement system is essentially stationary while the material moves in engagement therewith.

Under other circumstances, material moving relatively to a velocity measuring system may present extreme practical difficulties in effecting dependable engagement. This may be caused, in the design of specific machinery, by physical inaccessibility. In other instances, difficulties arise from the nature of the material itself. An instance of the latter circumstances occurs in the measurement of fluid velocity in a conduit. While various expedients are known in the arts to engage such a fluid by means of a screw, the operation of such devices in many instances lacks dependability, as well as accuracy.

The present invention contemplates the measurement of relative velocity by heating a restricted area of the material by impinging thereon, from the system, a pulse of light, to raise its temperature in the selected area. The thermal discontinuity produced by so irradiating the material is subsequently detected from a spaced position on the measuring system after a predetermined length of relative travel. The energy transit time between the system and the material is, in the practical environment of the application of the present invention, completely negligible. Consequently, the interval, as measured on the system between the emission of the energy pulse and detection of the resultant thermal radiation, affords an accurate basis for indicating relative speed between the system and the material.

Accordingly, the present invention provides a novel method and apparatus for detecting the velocity of relative movement between a measuring system and material spaced therefrom. The rate of relative movement may be indicated directly in terms of velocity, or, if desired, as some speed-dependent function, such as elapsed time between transmission from the light source and reception by the thermal detector. An electrical signal proportional to velocity or elapsed time is also provided.

The invention primarily contemplates the use of a short pulse of visible light to heat a small area of the relatively moving material. Although physical changes are developed in the material, it is an entirely passive component in the operation of the system and subsequently resumes its preexisting condition. In many circumstances, infrared radiation may be efficiently included or primarily relied upon for heating purposes. The materials involved, moreover, may exhibit selective characteristics which may affect the design of the pulsed light transmitter. Thus, for instance, material which is highly reflective in the visible region but absorbant for infrared radiation would suggest the use of the latter, while substances absorbant for the visible spectrum, or substantial portions thereof, might be efficiently heated by visible radiation. In other particular instances, it might be found that a particular material was relatively transparent to a particular band of radiation. Light of such frequency would obviously be relatively ineffective for heating the same for thermal detection. Consequently, another frequency band or bands would be employed in such an application.

As will now be understood, the primary object of the present invention is to determine relative speed between a measurement system and material spaced therefrom by detectably heating a portion of the material by light impinged thereon from the system and, after a predetermined relative movement, thermally detecting the heated portion of the material to determine a speed-dependent parameter of the relative travel time.

It is a further object of the invention to determine relative velocity to material without engaging the same by a physical instrumentality.

Figure 2:
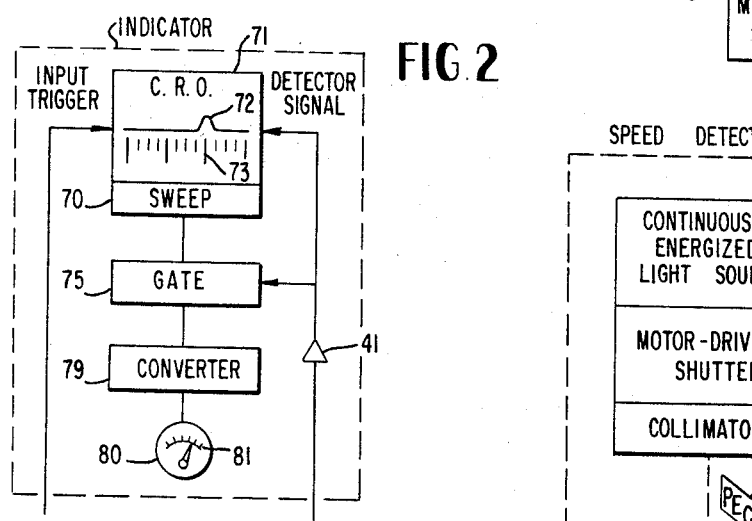
Figure 3:
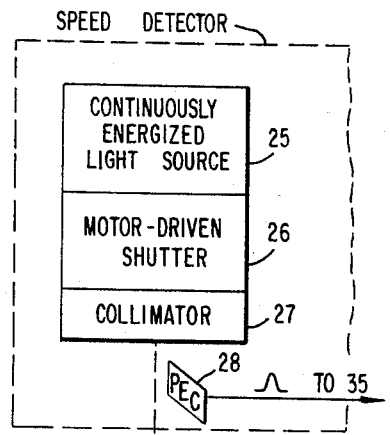
Figure 4:
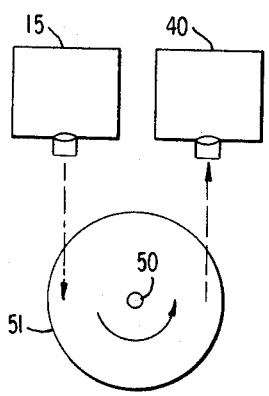
Figure 5:
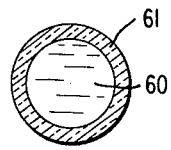

The invention will be further understood with reference to the specific embodiments of the apparatus shown in the drawings, in which:

FIGURE 1 shows a measurement system of the present invention, positioned for measuring the relative speed of remote material, FIGURE 2 shows an alternative indicator means for directly indicating velocity in the system of FIG. 1, FIGURE 3 shows an alternative pulsed light source for use in the speed detector of FIG. 1, FIGURE 4 shows the application of the invention to the measurement of angular velocity, and FIGURE 5 shows in section an alternative embodiment including moving fluid material.

In the example shown in FIG. 1 the material is indicated diagrammatically at 1, and the system for measuring the relative velocity comprises speed detector 2 and indicator 3. The material 1 may comprise a sheet of flat material, such as paper, for example, or textile material. The invention is directed to the use of materials which will transiently support temperature gradients along the direction of relative travel.

In the example of FIG. 1, relative motion between the system and the materials effected by drive motor 5 coupled with pinch rolls 6 engaging the material for traversing the same. The drive motor constitutes a variable speed device whose rate of rotation may be adjusted by manual control 7. The material is drawn from a material supply 8 and is received by material processing apparatus 9. As will be understood, in many industrial processes, the speed with which the material is supplied is highly important. The method of measuring the velocity of the material with respect to the system will now be described.

Light source means 15 are provided for irradiating the material to heat the same above its initial temperature, which in most cases, of course, will be ambient or room temperature. In order to develop a temperature gradient in the direction of travel of substantial magnitude for subsequent detection, the light source is collimated to provide a temperature gradient along an area of the material transverse to the direction of relative movement. In FIG. 1, a number of collimating means are shown. Screen 16, apertured with a rectangular opening 17, may be provided at an intermediate position between the light source and material 1. Screen 16, accordingly, restricts the radiation received by the material and will develop, with light source, the desired thermal increment in a restricted area. Light source 15, moreover, comprises an enclosure apertured at 19, which aperture itself constitutes collimating means. Moreover, lens 20 may be provided for focusing the light source on the material to produce the desired thermal effect in a restricted area. Opaque tube 21 extends from the aperture 19 in the light source and operates similarly.

The radiation spectrum transmitted to the material from the light source is, as above described, selected to establish a hotter spot on the material than its initial temperature. Accordingly, it will be appropriately selected with respect to the characteristics of the material, such as its reflectivity and absorption. For many purposes, an infrared rich source is desirable. Other sources, however, may be highly convenient, such as flash tubes used in photography and for stroboscopic applications. These tubes are normally energized by capacitor discharge, and may be periodically or recurrently operated at a convenient rate or repetition frequency. In some special instances, it may be desirable to employ or include ultraviolet light of a frequency band to which air is transparent. In general, therefore, the invention contemplates the use of electromagnetic radiation including ultraviolet visible and infrared regions of the spectrum. These light waves are applied to a selected area of the material to establish a temperature increment for later detection. In practice of the invention, a temperature increment of 10° F. above the room temperature of the material was entirely sufficient to provide for definitive detection and velocity measurement. The intensity of illumination may be selected to achieve such a temperature differential.

Where the material is traveling relative to the velocity measuring system at the time the light is to be radiated thereupon, a pulsed light source will be employed. Such flash tubes as mentioned above, afford a convenient source of pulsed light. Higher intensity sources are also of utility in the system of the present invention, such as lasers, or electrical arcs. A convenient way to obtain a pulsed light source with a continuously energized radiator, such as an electric arc, is shown in FIG. 3. The arc source, such as a carbon arc 25, is continuously energized and the radiation released toward the moving material in short pulses by a motor-driven shutter. Shutter 26 comprises a continuously motor-driven circular shutter having an aperture, or apertures, spaced at equal angular positions circumferentially around the circular shutter. Collimating means 27 are included in order to establish the desired thermal gradient in a restricted area of the material. Photoelectric cell 28 supplies a pulse coincident with material irradiation for purposes described below.

The pulse length of the impinging radiation will be selected with due respect to the velocity or the range of velocities to be encountered. At slow speeds of relative movement, the pulse may be relatively long, if desired, and this will permit the development of the necessary thermal increment in the material with lower average power output from the light source. On the other hand, high-intensity pulsed sources, such as flash tubes and lasers, are conveniently operated with very short periods of emission, such as a milli-second or a fraction thereof, and such sources may be used with relative movement of high velocity. They may also be used, of course, equally efficiently at low rates of relative movement.

The pulsed light source shown in FIG. 1, such as a flash tube or a laser, may be recurrently operated by a voltage trigger generator 30. When trigger generator is operated under switch 31, it supplies recurrent trigger pulses at a desired repetition interval, which is preferably longer than the travel time of the irradiated portion of the material to the detection position.

As a further example of the method of the present invention, trigger generator 30 is also provided with push button switch 32 and auxiliary circuitry to emit a single trigger pulse for activating the pulsed light source 15.

The control pulse supplied to the pulsed light source is also applied simultaneously to start gate 35 of time counter 36 to initiate its counting operation. Counter 36 (e.g., a Hewlett Packard Model #523C) begins to indicate the passage of time when area 37 of the material begins to receive light energy and its temperature is raised to establish the desired gradient. In the example of FIG. 1, area 37 of material 1 is moving to the right, and will be detected after its travel through a predetermined path length by thermal energy detector 40. When this event occurs, detector 40 supplies an electrical output signal which is amplified by amplifier 41 to supply a control pulse to stop gate 38 of counter 36. Counter 36 then terminates its counting operation and indicates the elapsed time between irradiation and detection of area 37, and thus provides the necessary information for determining the rate of material travel over the predetermined path length. Counter 36 may then be read and is in a condition to monitor a subsequent operation of the velocity measurement system under reactivation of the light source by push button 32, or continued operation of the recurrent trigger generator at a low repetition rate if switch 31 is in the operative position.

The thermal energy detector 40 is selected for high sensitivity to the infrared energy radiated by the restricted area 37 on which the light has impinged. Since, in general, these detectors respond to the average radiation intensity integrated throughout its field of view, the latter should preferably be constricted to conform with the area irradiated or a smaller area within its bounds. Consequently, collimating means are provided for thermal energy detector 40, as for the pulsed light source 15. These include aperture 42 in the enclosure of detector 40, tube 43 extending from the aperture toward the material 1, and the lens 44 positioned in aperture 42. When a thermal energy infrared detector is employed which is sensitive to radiation of the frequencies emitted by the pulsed light source, these may be prevented from reaching the detector by optical filters having transmission bands in the longer infrared regions to which the thermal energy detector 40 is sensitive, and which it receives from area 37 on material 1, while absorbing shorter wavelength energy emitted by the pulsed light source. Screen 47 may be employed to intercept direct radiation, if desired. If direct radiation is received by detector 40, its output pulse may be electronically suppressed, or, if desired, applied to start gate 35 in substitution for the trigger pulse from generator 30. When the directions of collimation, or optical axes, of source 15 and detector 40 are parallel, the travel path to be measured is independent of the transverse distance from the system to the material.

Thermal energy detectors have different inherent sensitivities, and the less sensitive examples will require the use of higher intensity radiation from the pulsed light source. It is preferred to use a lead sulphide detector cell, primarily responsive to the near infrared, such as one sold by Williamson Development Co., Inc., of West Concord, Mass., for use in their radiometer temperature measuring device. The output of such a cell, when suitably amplified at 41 is entirely sufficient to detect a temperature differential of 10° F. above a material background temperature of 75° F. Such a detector, moreover, is fully operative to supply a dependable output at distances at least as great as five feet from the material. It will be understood that the light source 15 may also be placed at similar distances from the material whose relative speed is under measurement. Thus, the inventive measurement system may be mounted on or under an automobile for indicating its speed relative to the road surface. With suitable web material where a temperature increment is also developed on the opposite web face, detector 40 may be collimated for measurement from either side of the web, as desired.

Rotational speeds may also be measured in accordance with the present invention as is shown in FIG. 4. Here a shaft 50, whose velocity of revolution is under measurement, is provided with disc 51 attached thereto. Pulsed light source 15 is positioned to irradiate a small area on the disc 51 when light source 15 is pulsed by operation of trigger generator 30 under control of push button 32. Thermal energy detector 40 is positioned in collimation with a predetermined angular displacement on the disc from the intersection of the direction of the collimation of light source 15. When light source 15 is pulsed, counter 35 begins operation and, when stopped by the amplified output pulse from detector 40, will indicate the time required for disc 51 to rotate through the predetermined angle. From this measurement, which constitutes a speed-dependent function of the travel time, the velocity of rotation may be computed.

In FIG. 5 is shown a configuration for use of the velocity measurement system of the present invention with traveling fluid media 60 encased in a transparent conduit or pipe 61. The pipe, which is shown in section, will be positioned aligned with light source 15 and detector 40, as is the material 1 shown in FIG. 1 of the drawings. In case velocity profiles at various distances inward of the conduit wall are to be measured, detector 40 would be collimated at right angles to the optical axis of source 15 and successively positioned for measurement at incrementally adjusted positions. The pipe 61 is constructed of material relatively transparent to the incident energy from light source 15, which in turn is substantially absorbed in the gas or liquid 60. Condit 61 is also transparent to the thermal energy released by the heated fluid after irradiation by light source 15 for detection by thermal energy detector 40.

FIG. 2 shows an alternative arrangement for indicator 3 in the system of FIG. 1. Here, the input trigger signal from trigger generator 30, or an amplified output signal from photoelectric cell 28 of FIG. 3, is applied to trigger sweep generator 70 of cathode ray oscilloscope 71.

Sweep generator 70 is normally quiescent and responds to a trigger signal with a single sweep cycle. The output pulse from the thermal detector is applied to the vertical deflection circuit of the oscilloscope, where it is indicated at 72. The travel time of the material may be read on calibration 73 overlying the tube.

The detector signal is used to open normally blocked gate 75 during output from detector 40. The sweep voltage itself, a linear wave increasing with time initiated with the light pulse, is applied to the gate input. The voltage at which this wave is gated depends directly upon travel velocity.

Thus, gate 75 is opened momentarily to transmit the sweep signal at a voltage proportionately dependent upon the time delay of the detector output pulse after the operation of light source 15. This output voltage is supplied to converter 79 from gate 75. The output of converter 79 varies proportionately to the input voltage and is employed to operate indicating instrument 80, which may be directly calibrated at 81 in terms of linear velocity for a particular travel path of material 1 from its intersection with the optical axis of light source 15 to that of detector 40. It will be understood, of course, that meter 80 of FIG. 2 would not be satisfactorily operative under a single pulse operation of pulsed light source 15 by push button 32 of trigger 30, although such operation could be read directly by the resultant indication, such as 72, on the cathode ray oscilloscope.

In the system of FIG. 1, where a particular material feed velocity is desired for the material processing apparatus 9, such velocity can be obtained by adjusting the speed of rotation of drive motor 5 by control 7 in accordance with the information provided by counter 36 or cathode ray indication 72 and meter 80.

From the foregoing description, it will be appreciated that the invention provides an improved method and apparatus for accurately measuring the relative speed of movement between the measurement system and material. It is believed obvious that many modifications and variations of the present invention are possible in the light of, and within the scope of, the specification. It is therefore to be understood that changes may be made in the particular embodiments of the invention described, which are within the fully intended scope of the invention as defined by the appended claim.

What is claimed is:
1. A system for measuring the velocity of relatively moving material comprising:
    laser light source means recurrently operative with a fixed repetition interval independent of material velocity for periodically impinging a momentary pulse of light on the material in a restricted area thereof,
    infrared detector means positioned to detect the irradiated area of the material after relative movement through a predetermined path length, and
    indicator means comprising means initiated into operation synchronously with operation of the light source means and responsive to the detector means to indicate a speed dependent function of the travel time.

References Cited

UNITED STATES PATENTS

| 2,603,688 | 7/1952 | Cole | 324—70 |
| 2,941,145 | 6/1960 | Roberts | 324—70 |
| 2,926,335 | 2/1960 | Bower | 324—70 |
| 2,989,690 | 6/1961 | Cook | 324—70 |
| 3,315,159 | 4/1967 | Gith | 324—70 |
| 2,786,978 | 3/1957 | Warner | 324—70 |

FOREIGN PATENTS 1,009,831    6/1957    Germany.

RUDOLPH V. ROLINEC, *Primary Examiner.*

M. LYNCH, *Assistant Examiner.*